US012659966B2

(12) United States Patent
Liao et al.

(10) Patent No.: US 12,659,966 B2
(45) Date of Patent: Jun. 16, 2026

(54) METHOD AND APPARATUS FOR PROVIDING A UNIFIED CONTROL CHANNEL FRAMEWORK IN MOBILE COMMUNICATIONS

(71) Applicant: MediaTek Inc., Hsinchu City (TW)

(72) Inventors: Yi-Ju Liao, Hsinchu City (TW);
Pei-Kai Liao, Hsinchu City (TW);
Chi-Hsuan Hsieh, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 366 days.

(21) Appl. No.: 18/233,978

(22) Filed: Aug. 15, 2023

(65) Prior Publication Data

US 2024/0098754 A1     Mar. 21, 2024

Related U.S. Application Data

(60) Provisional application No. 63/375,702, filed on Sep. 15, 2022.

(51) Int. Cl.
*H04W 72/232*     (2023.01)
*H04L 1/00*     (2006.01)
*H04W 72/12*     (2023.01)

(52) U.S. Cl.
CPC ......... *H04W 72/232* (2023.01); *H04L 1/0038* (2013.01); *H04W 72/12* (2013.01)

(58) Field of Classification Search
CPC .... H04W 72/232; H04W 72/12; H04L 1/0038
See application file for complete search history.

(56) References Cited

U.S. PATENT DOCUMENTS

| | | | |
|---|---|---|---|
| 2020/0304159 A1* | 9/2020 | Liao | H04J 11/0036 |
| 2022/0132534 A1* | 4/2022 | Jang | H04L 5/0051 |
| 2022/0408458 A1* | 12/2022 | MolavianJazi ... | H04W 72/1263 |

FOREIGN PATENT DOCUMENTS

WO     WO-2023164820 A1 *   9/2023   ........ H04W 72/1273

* cited by examiner

*Primary Examiner* — Samina F Choudhry
(74) *Attorney, Agent, or Firm* — Andy M. Han; Han IP PLLC

(57)     ABSTRACT

Various solutions for providing a unified control channel framework in mobile communications are described. An apparatus receives a first-stage downlink control information (DCI) from a network node. The first-stage DCI indicates first scheduling information associated with a second-stage DCI. Then, the apparatus receives the second-stage DCI from the network node according to the first scheduling information. The second-stage DCI indicates second scheduling information associated with one or more carriers or cells or indicates non-scheduling information associated with one or more features. Also, the apparatus performs operations including either one of the following: (1) performing a PDSCH reception or a PUSCH transmission on at least one of the one or more carriers or cells according to the second scheduling information; and (2) applying the non-scheduling information in an event that the apparatus supports at least one of the one or more features.

20 Claims, 10 Drawing Sheets

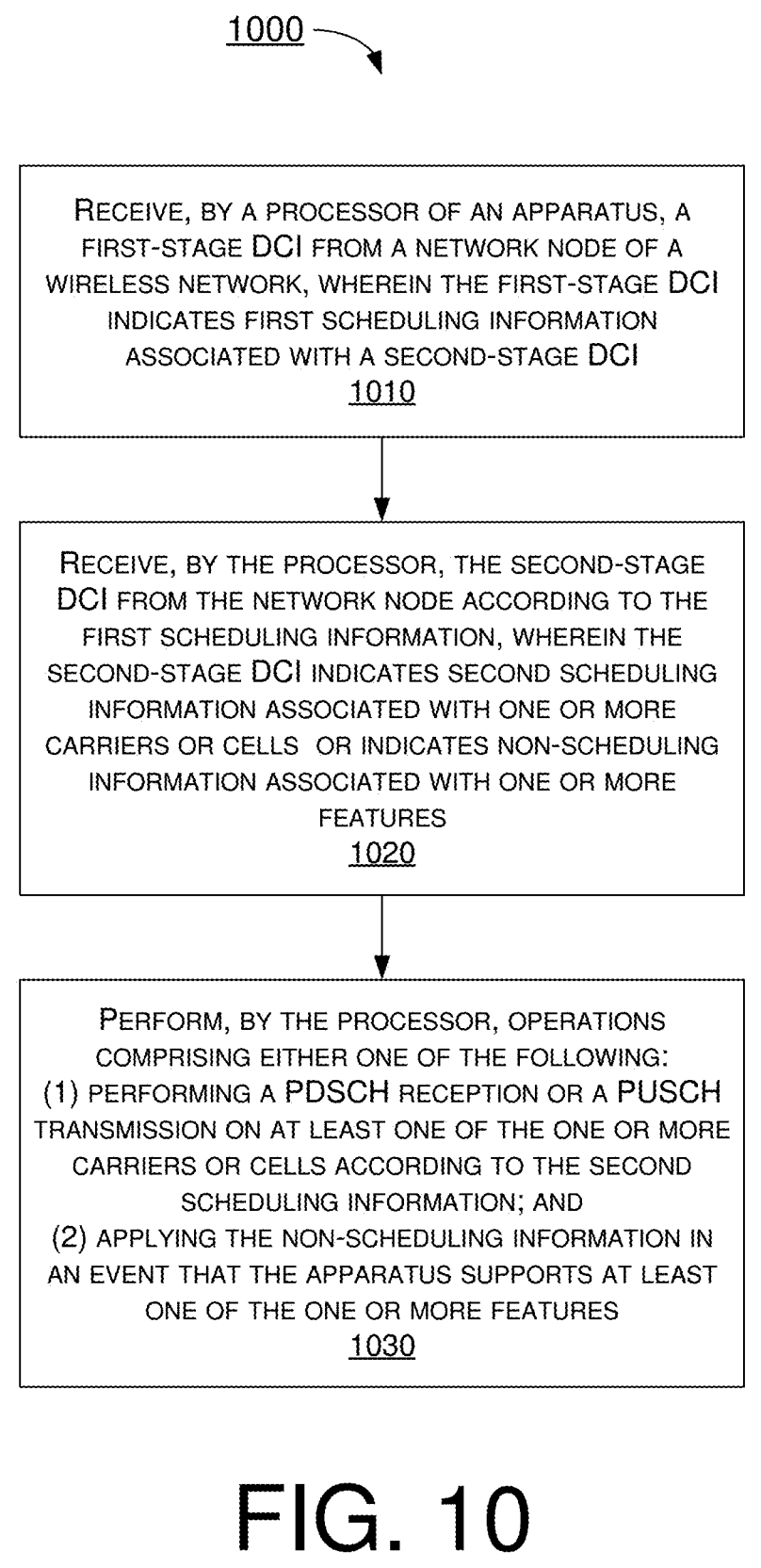

1000 ⟍

RECEIVE, BY A PROCESSOR OF AN APPARATUS, A FIRST-STAGE DCI FROM A NETWORK NODE OF A WIRELESS NETWORK, WHEREIN THE FIRST-STAGE DCI INDICATES FIRST SCHEDULING INFORMATION ASSOCIATED WITH A SECOND-STAGE DCI
1010

RECEIVE, BY THE PROCESSOR, THE SECOND-STAGE DCI FROM THE NETWORK NODE ACCORDING TO THE FIRST SCHEDULING INFORMATION, WHEREIN THE SECOND-STAGE DCI INDICATES SECOND SCHEDULING INFORMATION ASSOCIATED WITH ONE OR MORE CARRIERS OR CELLS OR INDICATES NON-SCHEDULING INFORMATION ASSOCIATED WITH ONE OR MORE FEATURES
1020

PERFORM, BY THE PROCESSOR, OPERATIONS COMPRISING EITHER ONE OF THE FOLLOWING:
(1) PERFORMING A PDSCH RECEPTION OR A PUSCH TRANSMISSION ON AT LEAST ONE OF THE ONE OR MORE CARRIERS OR CELLS ACCORDING TO THE SECOND SCHEDULING INFORMATION; AND
(2) APPLYING THE NON-SCHEDULING INFORMATION IN AN EVENT THAT THE APPARATUS SUPPORTS AT LEAST ONE OF THE ONE OR MORE FEATURES
1030

FIG. 10

METHOD AND APPARATUS FOR PROVIDING A UNIFIED CONTROL CHANNEL FRAMEWORK IN MOBILE COMMUNICATIONS

CROSS REFERENCE TO RELATED PATENT APPLICATION(S)

The present disclosure is part of a non-provisional application claiming the priority benefit of U.S. Patent Application No. 63/375,702, filed 15 Sep. 2022, the content of which herein being incorporated by reference in its entirety.

TECHNICAL FIELD

The present disclosure is generally related to mobile communications and, more particularly, to providing a unified control channel framework in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), multi-link operation is introduced to increase system capacity and transmission efficiency of the communication systems. Multi-link operation can be implemented by carrier aggregation (CA) or dual connectivity (DC), where additional links are used to increase the amount of data that can be transferred to and from the user equipment (UE). The UE can be configured with more than one radio links (e.g., component carriers (CCs)) and can connect to more than one network nodes (e.g., serving cells). Under the current CA framework of NR, one CC is associated with one cell and the complexity/overhead of layer-one (L1) signalling increases with the number of CCs/cells. For example, when more than four CCs/cells are configured for CA, the UE's blind decoding (BD) capability may be implemented in a way that the maximum number of BD attempts per slot is confined as if there are only four CCs/cells, which comes with the cost of user-perceived throughput (UPT) degradation due to potential PDCCH blocking. Alternatively, the UE's BD capability may be implemented to support that the maximum number of BD attempts per slot increases with the real number of configured CCs/cells, but the BD complexity will inevitably affect the UE's cost. Another problem with the 1-to-1 association between CC and cell is that there are (potential) common bit-fields in the respective downlink control information (DCI) for each configured CC/cell in CA, which results in DCI overhead and scheduling inefficiency. For example, in the case of intra-band CA, there may be up to 44% of DCI bits that are duplicate across multiple DCIs.

Accordingly, how to reduce BD complexity and DCI overhead while maintaining forward compatibility in L1 signaling becomes an important issue for the newly developed wireless communication network. Therefore, there is a need to provide proper schemes to solve this issue.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issue pertaining to undesired BD complexity and DCI overhead in L1 signaling.

In one aspect, a method may involve an apparatus receiving a first-stage DCI from a network node of a wireless network, wherein the first-stage DCI indicates first scheduling information associated with a second-stage DCI. The method may also involve the apparatus receiving the second-stage DCI from the network node according to the first scheduling information, wherein the second-stage DCI indicates second scheduling information associated with one or more carriers or cells or indicates non-scheduling information associated with one or more features. The method may further involve the apparatus performing operations comprising either one of the following: (1) performing a PDSCH reception or a PUSCH transmission on at least one of the one or more carriers or cells according to the second scheduling information; and (2) applying the non-scheduling information in an event that the apparatus supports at least one of the one or more features.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a first-stage DCI from a network node of a wireless network, wherein the first-stage DCI indicates first scheduling information associated with a second-stage DCI. The processor may also perform operations comprising receiving, via the transceiver, the second-stage DCI from the network node according to the first scheduling information, wherein the second-stage DCI indicates second scheduling information associated with one or more carriers or cells or indicates non-scheduling information associated with one or more features. The processor may further perform operations comprising either one of the following: (1) performing a PDSCH reception or a PUSCH transmission on at least one of the one or more carriers or cells according to the second scheduling information; and (2) applying the non-scheduling information in an event that the apparatus supports at least one of the one or more features.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), beyond 5G (B5G), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 10 is a flowchart of an example process in accordance with an implementation of the present disclosure.

DETAILED DESCRIPTION OF PREFERRED IMPLEMENTATIONS

Figure 1:
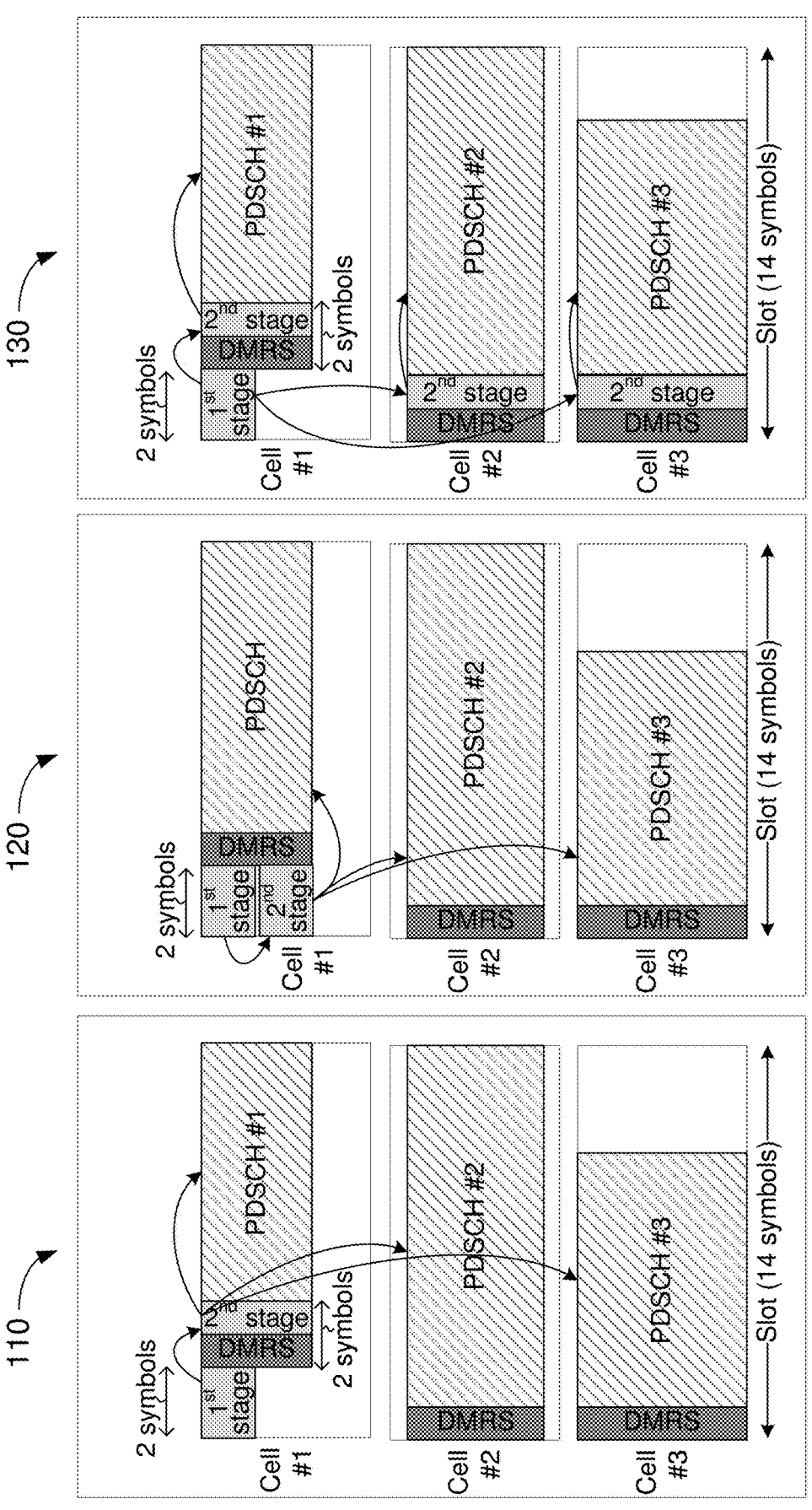
FIG. 1 is a diagram depicting example scenarios of a unified two-stage DCI framework for single-cell scheduling in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancements on multi-cell scheduling with a single DCI. According to the present disclosure, a number of possible solutions may be implemented separately or jointly. That is, although these possible solutions may be described below separately, two or more of these possible solutions may be implemented in one combination or another.

In 3$^{rd}$ Generation Partnership Project (3GPP), a radio access network (e.g., 5G NR access network) may include a plurality of BSs (e.g., Next Generation Node-Bs (gNBs)) to communicate with a plurality of mobile stations referred as UEs. In a typical 5G NR network, one BS is operable to provide radio coverage to a specific geographical area using a plurality of cells forming a radio access network. The BS may support the operations of the plurality of cells, and each cell may be operable to provide services to at least one UE within its radio coverage. Specifically, each cell may provide services to serve one or more UEs within its radio coverage based on at least one DCI, where a radio coverage of one cell may overlap with another radio coverage of other cell(s). In one example, each cell may schedule a DL/UL resource to one UE within its radio coverage by one DCI for performing a DL/UL transmission. If the UE can support more than one cell (e.g., application in dual connectivity), the UE may receive more than one DCI for scheduling DL/UL transmissions with the more than one cells. However, under the current CA framework in 5G NR, one CC is associated with one cell and the complexity/overhead of L1 signalling increases with the number of CCs/cells.

In view of the above, the present disclosure proposes a number of schemes pertaining to providing a unified control channel framework in mobile communications. According to the schemes of the present disclosure, a unified two-stage DCI framework is provided in which a first-stage DCI is transmitted first to deliver the scheduling information of a second-stage DCI, and the second-stage DCI is then transmitted to deliver more specific information for further operations, including data scheduling (i.e., scheduling of PDSCH reception(s) and/or PUSCH transmission(s)) and non-scheduling control (e.g., slot format configuration, physical uplink control channel (PUCCH)/physical uplink shared channel (PUSCH) power control, preemption indication, wake-up indication, etc.). Specifically, the first-stage DCI has a very compact size and is transmitted on physical downlink control channel (PDCCH) where blind decoding (BD) is required to be performed in search space configured by higher-layer signaling. The second-stage DCI is transmitted on a DCI-only channel (e.g., physical downlink shared channel (PDSCH) or PDCCH) where no BD is required since the UE gets to receive the second-stage DCI on specific resource elements signaled in the first-stage DCI. Accordingly, by applying the schemes of the present disclosure, the BD complexity and DCI overhead in L1 signaling may be significantly reduced.

FIG. 1 illustrates example scenarios 110, 120, and 130 of a unified two-stage DCI framework for single-cell scheduling in accordance with implementations of the present disclosure. As shown in FIG. 1, the time and/or frequency location of the first-stage DCI is always in the control region of the scheduling cell, while the time and/or frequency location of the second-stage DCI may be in the control region of the scheduling cell or in the data region of the scheduled cell(s). Scenario 110 depicts a unified two-stage DCI framework with the second-stage DCI being provided in the data region of the scheduling cell (denoted as Cell #1). Scenario 120 depicts a unified two-stage DCI framework with the second-stage DCI being provided in the control region of the scheduling cell (denoted as Cell #1). Scenario 130 depicts a unified two-stage DCI framework with the second-stage DCI being provided in the data region of the scheduled cell (denoted as Cell #1, Cell #2, and Cell #3).

When the second-stage DCI is provided in the data region, its demodulation reference signal (DMRS) for channel estimation may be shared with the data channel (e.g., PDSCH). After receiving both the first-stage DCI and the second-stage DCI, the UE may perform PDSCH reception or PUSCH transmission on the scheduled carrier(s)/cell(s) based on the scheduling information signaled in the second-stage DCI.

In some implementations, both the first-stage DCI and the second-stage DCI may be transmitted if the number of scheduled PDSCH/PUSCH is greater than or equal to one. Otherwise, if no PDSCH/PUSCH is scheduled, both the first-stage DCI and the second-stage DCI may not exist (i.e., not transmitted).

In some implementations, the UE may receive and decode the second-stage DCI only when its corresponding first-stage DCI is detected.

Figure 2:
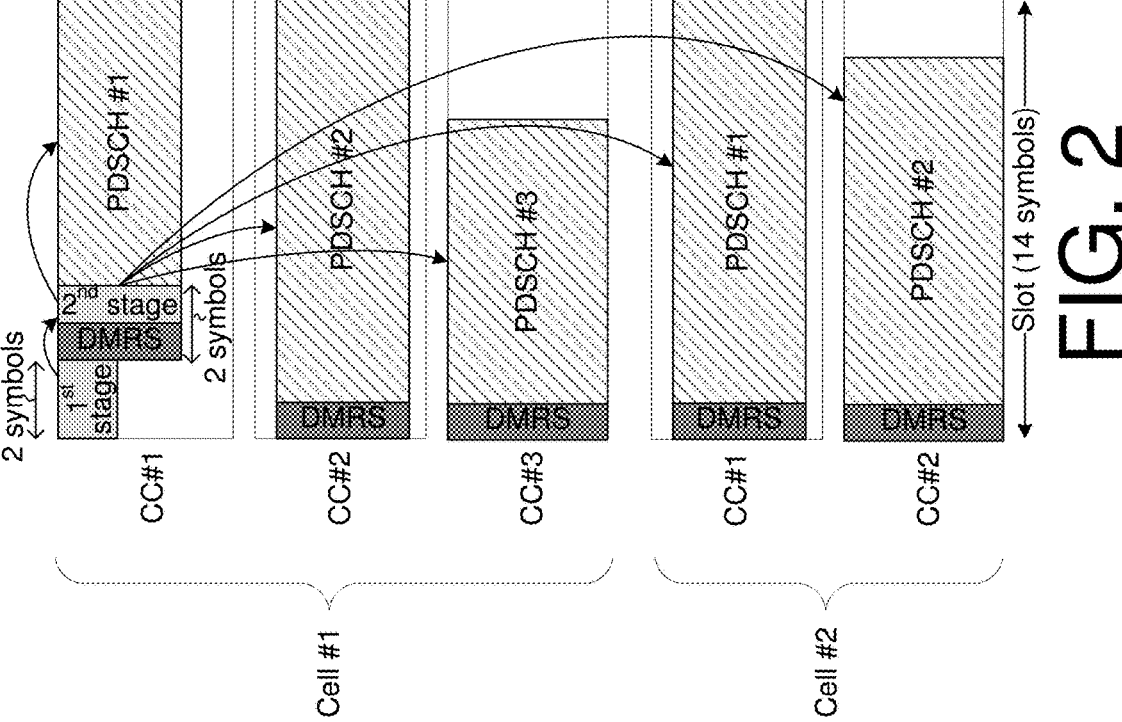
FIG. 2 is a diagram depicting an example scenario of a unified two-stage DCI framework for multi-cell scheduling in accordance with an implementation of the present disclosure.
Figure 2:

FIG. 2 illustrates an example scenario 200 of a unified two-stage DCI framework for multi-cell scheduling in accordance with an implementation of the present disclosure. As shown in FIG. 2, there are two discrete cells, each of which includes more than one CCs, and the unified two-stage DCI framework may be applied for scheduling across these two cells. In scenario 200, the time and/or frequency location of the first-stage DCI is in the control region of the scheduling cell, and the time and/or frequency location of the second-stage DCI is in the data region of the scheduling cell. Specifically, only anchor cell (e.g., Cell #1) may serve as the scheduling cell, while non-anchor cell(s) (e.g., Cell #2) may only serve as scheduled cell(s), i.e., no PDCCH being transmitted in non-anchor cell(s). An anchor cell may be a primary cell or configured via higher-layer signaling (e.g., master information block (MIB), system information block (SIB)) and/or UE-specific RRC signaling. In one example, same-carrier/cell scheduling may not be allowed/supported for non-anchor cell. Alternatively, if same-carrier/cell scheduling is allowed/supported, then the number of BDs may be scaled up with the number of carriers/cells.

In some implementations, the unified two-stage DCI framework may not be necessary for broadcast PDCCH due to the following considerations. Firstly, a single-stage DCI (e.g., one single DCI carrying scheduling information regarding one PDSCH/PUSCH) may be reused for broadcast PDCCH, such as a PDCCH with cyclic redundancy check (CRC) scrambled by system information-radio network temporary identifier (SI-RNTI), paging-RNTI (P-RNTI), random access-RNTI (RA-RNTI)/message-B-RNTI (MsgB-RNTI), or multicast broadcast service (MBS) control channel-RNTI (MCCH-RNTI)/group-RNTI (G-RNTI). Secondly, at least for SI, paging, and random access response (RAR), there may not be obvious advantage to use a two-stage DCI framework from the point of views of both BS and UE. For example, a single-stage DCI may be reused and only transmitted on the primary cell of a master cell group (MCG), contributing to fixed number of BDs and DCI overhead. Also, if two-stage DCI is used with different periodicity but only one DCI is required, there may be additional CRC overhead especially for beam sweeping.

In some implementations, the unified two-stage DCI framework may be supported for uni-cast and multi-cast PDCCH, without causing an increase in the number of BDs. For example, the DCI format for two-stage DCI may be differentiated either by DCI format identifier in the first-stage DCI or by RNTI type.

Figure 3:
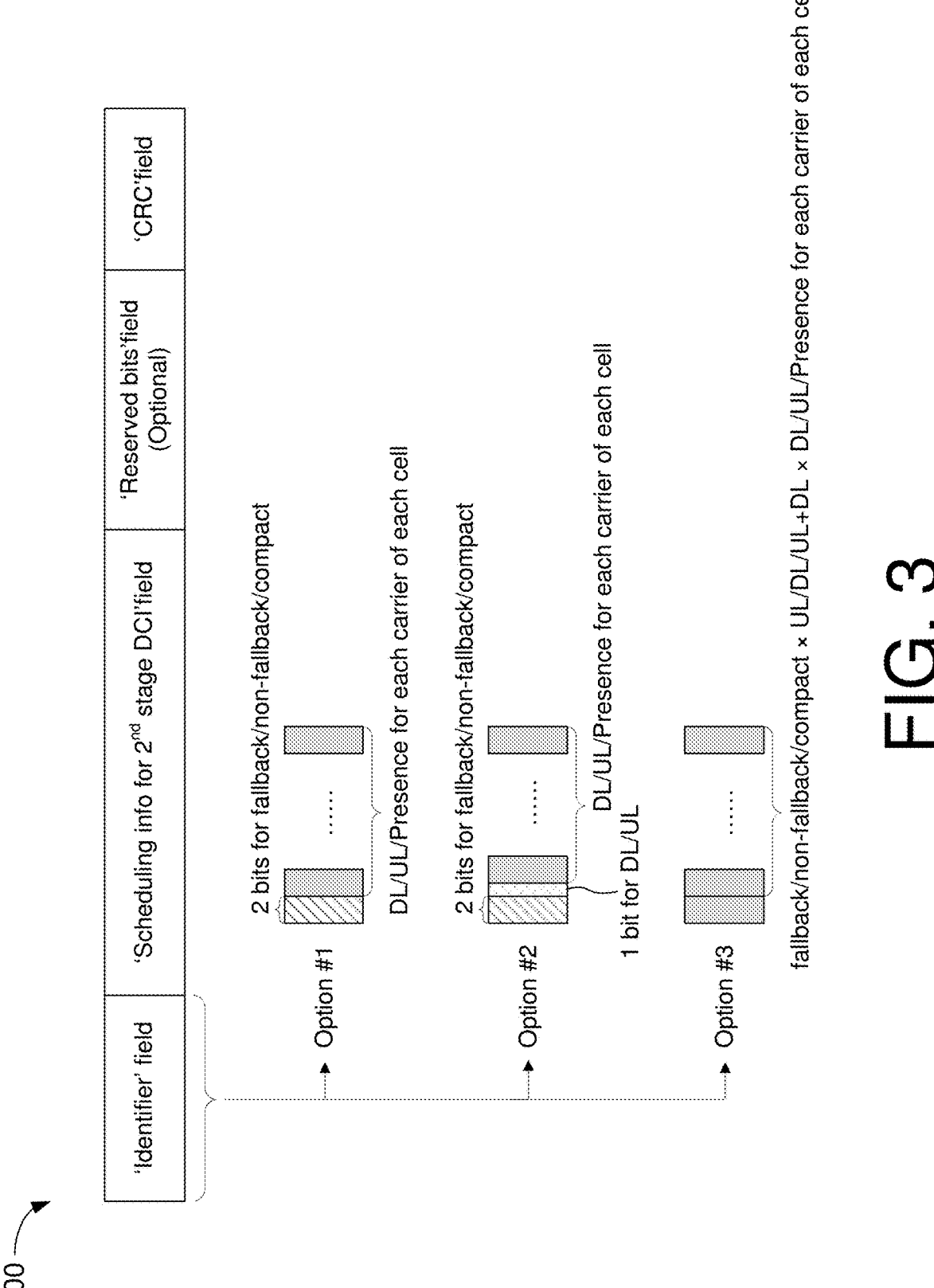
FIG. 3 is a diagram depicting an example scenario of DCI format for a first-stage DCI in accordance with an implementation of the present disclosure.

FIG. 3 illustrates an example scenario 300 of DCI format for a first-stage DCI in accordance with an implementation of the present disclosure. As shown in FIG. 3, the DCI format of a first-stage DCI may include at least a 'identifier' field, a 'scheduling information for the second-stage DCI' field, a 'reserved bits' field, and a 'CRC' field. The UE may further receive a second-stage DCI and interpret the contents of the second-stage DCI based on the information in the first-stage DCI. In one example, the maximum number of scheduled PDSCH (or PUSCH) in one two-stage DCI is 16. Specifically, the 'identifier' field may be used to indicate the UL PUSCH/DL PDSCH scheduling information in the second-stage DCI. For example, the 'identifier' field may include at least one or a set of the following information: (1) a format of the second-stage DCI is a fallback, non-fallback, or compact DCI; (2) either one or both of a DL PDSCH and an UL PUSCH is or are scheduled in the second-stage DCI; and (3) whether a DL PDSCH or an UL PUSCH for each bandwidth part (BWP), carrier, or cell is scheduled in the second-stage DCI.

More specifically, there may be different options for implementation of the 'identifier' field. In option 1, X bit(s) (e.g., X=2) may be used to indicate that the DCI format of the second-stage DCI is a fallback, non-fallback, or compact DCI, where $X=\lceil \log_2 N \rceil$ with N being the number of considered DCI formats, and a bit map may be used to indicate whether DL PDSCH and/or UL PUSCH (i.e., DL, UL, DL+UL or no scheduling) is scheduled for each BWP, carrier, and/or cell. The order of sub-fields (e.g., 2 bits for each sub-field) in the bit map may be arranged from lowest BWP index of carrier index of lowest cell index, or from lowest carrier index of lowest cell index, or from lowest cell index, or vice versa (i.e., from highest index).

In option 2, X bit(s) (e.g., X=2) may be used to indicate that the DCI format of the second-stage DCI is a fallback, non-fallback, or compact DCI, where $X=\lceil \log_2 N \rceil$ with N being the number of considered DCI formats, and Y bit(s) (e.g., Y=1) may be used to indicate DL PDSCH and/or UL PUSCH in the second-stage DCI. Note that the X bit(s) and the Y bit(s) may be indicated jointly or separately. Moreover, a bit map may be used to indicate whether DL PDSCH and/or UL PUSCH (i.e., DL, UL, DL+UL or no scheduling) is scheduled for each BWP, carrier, and/or cell. The order of sub-fields (e.g., 1 bit for each sub-field) in the bit map may be arranged from lowest BWP index of carrier index of lowest cell index, or from lowest carrier index of lowest cell index, or from lowest cell index, or vice versa (i.e., from highest index).

In option 3, a bit map may be used to jointly indicate the following for each BWP, carrier, and/or cell: (1) the DCI format of the second-stage DCI, (2) DL PDSCH and/or UL PUSCH, and (3) whether DL PDSCH and/or UL PUSCH (i.e., DL, UL, DL+UL or no scheduling) is scheduled. The order of sub-fields (e.g., 4 bit for each sub-field) in the bit map may be arranged from lowest BWP index of carrier index of lowest cell index, or from lowest carrier index of lowest cell index, or from lowest cell index, or vice versa (i.e., from highest index).

Referring back to FIG. 3, the 'scheduling information for the second-stage DCI' field may be used to schedule the second-stage DCI (i.e., to provide the scheduling information of the second-stage DCI). That is, the UE may receive the second-stage DCI on specific time/frequency resource based on the information in this field. In one example, the data format for 'scheduling information for the second-stage DCI' field may be defined by using a configured-grant-like method. Specifically, N sets of configurations for the second-stage DCI may be configured via higher-layer signaling (e.g., UE-specific RRC signaling), and then this field in the first-stage DCI may be used to further indicate the selected set, where N≥1 and there may be ⌈log₂N⌉ bits in this field. It is noteworthy that the configured-grant-like method may advantageously reduce the signaling overhead and may be beneficial for the UE processing timeline (e.g., UE implementation can decode all possibilities before finishing the decoding of the first-stage DCI). In another example, the data format for 'scheduling information for the second-stage DCI' field may be defined by using a fully-dynamic scheduling method. Specifically, all scheduling information is provided by the first-stage DCI. It is noteworthy that the fully-dynamic scheduling method may realize better scheduling flexibility (e.g., when compared to the configured-grant-like method). For the fully-dynamic scheduling method, at least one or a set of the following information may be provided in the 'scheduling information for the second-stage DCI' field: (1) frequency domain resource assignment, (2) time domain resource assignment, (3) virtual resource blocks (VRB)-to-physical resource blocks (PRB) mapping (or interleaved or non-interleaved mapping), (4) modulation and coding scheme, (5) redundancy version (e.g., RV0 or RV3, self-decodable RV), (6) DMRS configuration (e.g., UE can also know whether DMRS of the second-stage DCI is shared with scheduled PDSCH in the same BWP/carrier/cell via this information), (7) transmission configuration indicator (TCI) state, and (8) reserved bits. For the configured-grant-like method, at least one or a set of above information (1) to (7) may be provided for a second-stage DCI candidate by UE-specific RRC signaling.

In some implementations, the DCI size for the first-stage DCI may be aligned to the DCI size for broadcast PDCCH. Alternatively, the DCI size for the first-stage DCI may be configurable DCI size.

In some implementations, the bit field size in the first-stage DCI may be scalable, and the UE may determine the bit field size based on information provided via higher-layer signaling (e.g., UE-specific RRC signaling), where the information may include the data format of the second-stage DCI (e.g., configured-grant-like or fully-dynamic-scheduling method), the granularity of frequency domain resource allocation (e.g., 2 RB, 6 RB or full band), and/or the maximum number of PDSCH/PUSCH scheduled in the second-stage DCI.

In some implementations, the same RNTI type may be applied for both the first-stage DCI and the second-stage DCI. For example, the RNTI type may be use-case dependent, e.g., cell-RNTI (C-RNTI) for unicast PDCCH, side-link-RNTI (SL-RNTI) for sidelink use case, or X-RNTI (i.e., various RNTIs collectively referred to as X-RNTI) for non-scheduling DCI.

Figure 4:
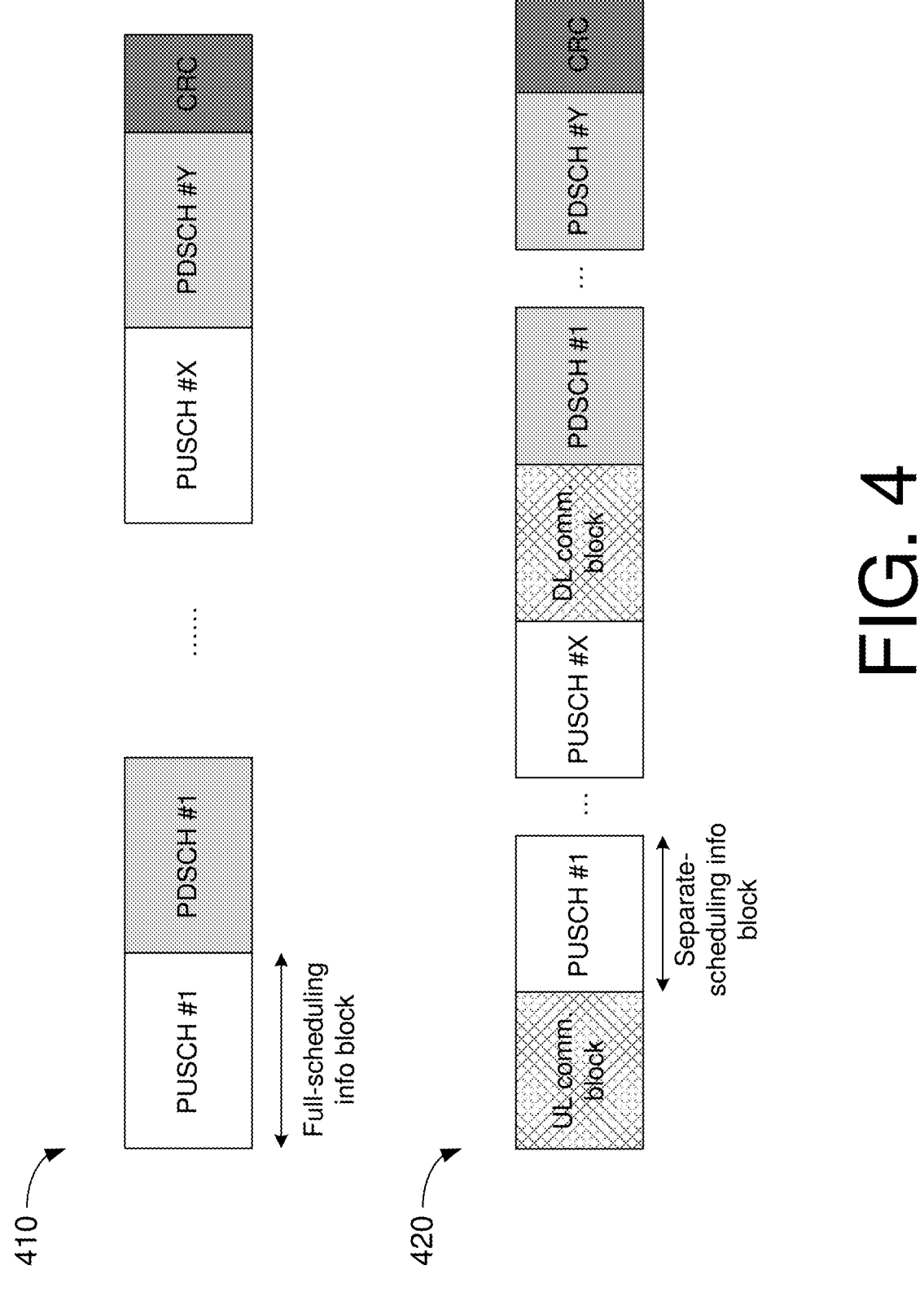
FIG. 4 is a diagram depicting example scenarios of DCI format for a second-stage DCI in accordance with implementations of the present disclosure.

FIG. 4 illustrates example scenarios 410 and 420 of DCI format for a second-stage DCI in accordance with implementations of the present disclosure. Scenario 410 depicts a DCI format for a second-stage DCI, which includes one or multiple cascaded full-scheduling (e.g., UL and/or DL) information blocks. Each full-scheduling information block provides complete scheduling information (i.e., DCI) for corresponding scheduled DL PDSCH or UL PUSCH indicated by the 'scheduling information for the second-stage DCI' field in the first-stage DCI. Although the scheduling information for PUSCH is arranged before the scheduling information for PDSCH as shown in scenario 410, please note that the order of scheduling information for PUSCH and PDSCH may be exchanged. Scenario 420 depicts a DCI format for a second-stage DCI, which includes UL and/or DL common block(s) and one or multiple cascaded UL and/or DL separate-scheduling information blocks. Complete UL/DL scheduling information for each PUSCH/

PDSCH is made up of the UL/DL common block and each PUSCH/PDSCH separate-scheduling information block. Specifically, the UL/DL common block includes the common scheduling information for signaling overhead reduction, while each PUSCH/PDSCH separate-scheduling information block includes BWP/carrier/cell-specific scheduling information. In one example, the fields or contents in the UL/DL common block may be configured by higher-layer signaling (e.g., UE-specific RRC signaling) (i.e., higher-layer signaling is provided to indicate what information is in the UL/DL common block), and what information is included in the UL/DL common block may be configured per cell group. For instance, for cells in intra-band and in inter-band, a UE may extract different fields in the UL/DL common block. In general, cells in intra-band may have more common scheduling information. In another example, the fields or contents in the UL/DL common block may be pre-defined in 3GPP specification, and the UL/DL common block may provide at least one or a set of the following information: (1) the PUCCH resource for hybrid automatic repeat request (HARQ)-acknowledgement (ACK) feedback, (2) a downlink assignment index. Similar to scenario 410, the order of scheduling information for PUSCH and PDSCH may be exchanged in scenario 420 as well.

Figure 5:
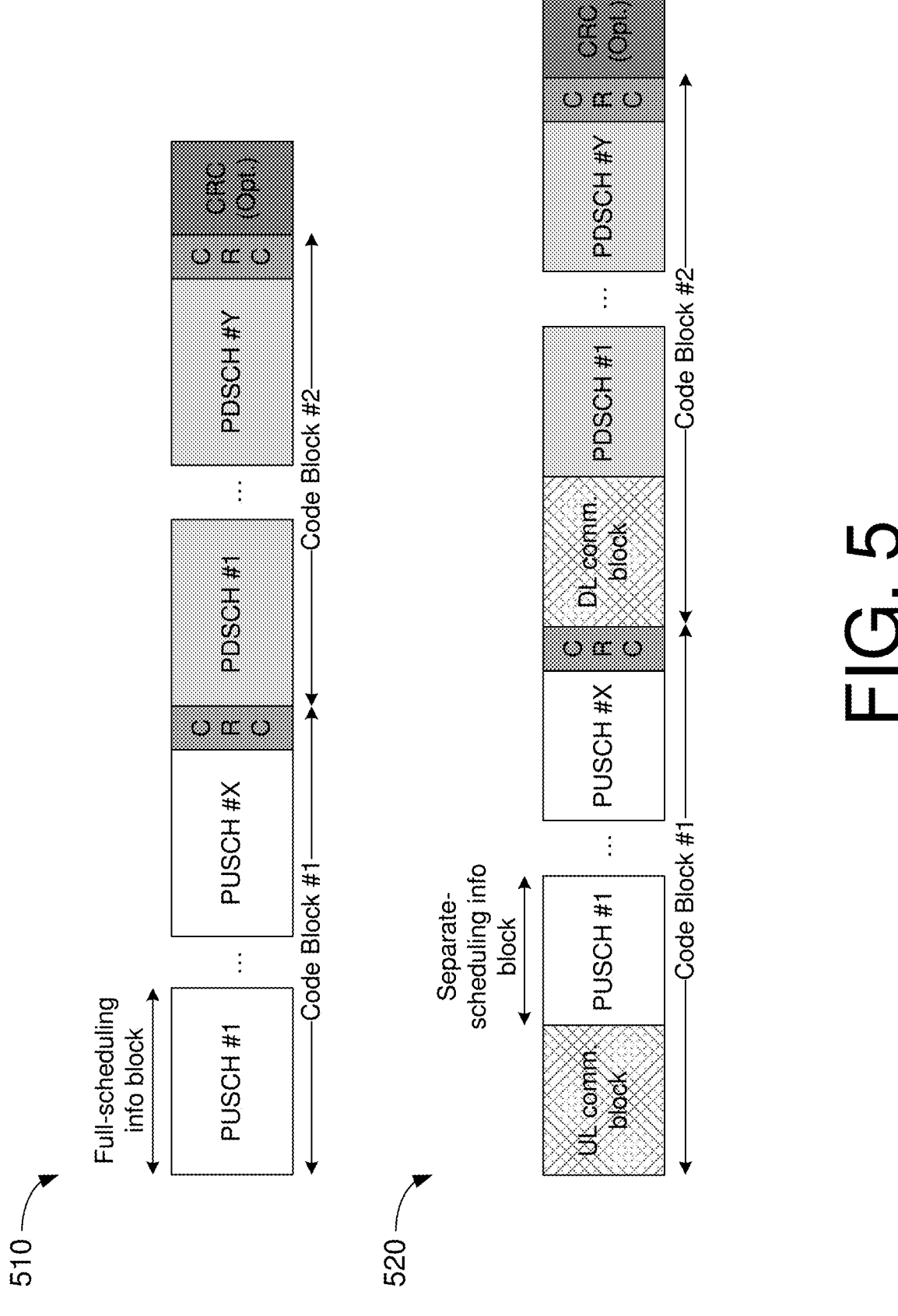
FIG. 5 is a diagram depicting example scenarios 510 and 520 of DCI format for a second-stage DCI in accordance with implementations of the present disclosure.

FIG. 5 illustrates example scenarios 510 and 520 of DCI format for a second-stage DCI in accordance with implementations of the present disclosure. As shown in FIG. 5, separate code blocks (CBs) may be used for UL and DL scheduling information, such that the UE is allowed to parse UL/DL scheduling information first to relax the processing timeline and the signaling overhead may be smaller if the second-stage DCI is retransmitted. Specifically, scenario 510 depicts a DCI format for a second-stage DCI, which includes a first CB to contain all full-scheduling information blocks for UL and a second CB to contain all full-scheduling information blocks for DL. Scenario 520 depicts a DCI format for a second-stage DCI, which includes a first CB to contain the UL common block and all separate-scheduling information blocks for UL and a second CB to contain the DL common block and all separate-scheduling information blocks for DL. Each CB and the complete second-stage DCI may contain a respective CRC field, wherein the CRC field of the complete second-stage DCI may be optional since the integrity of each CB can be verified with the corresponding CRC field thereof.

Figure 6:
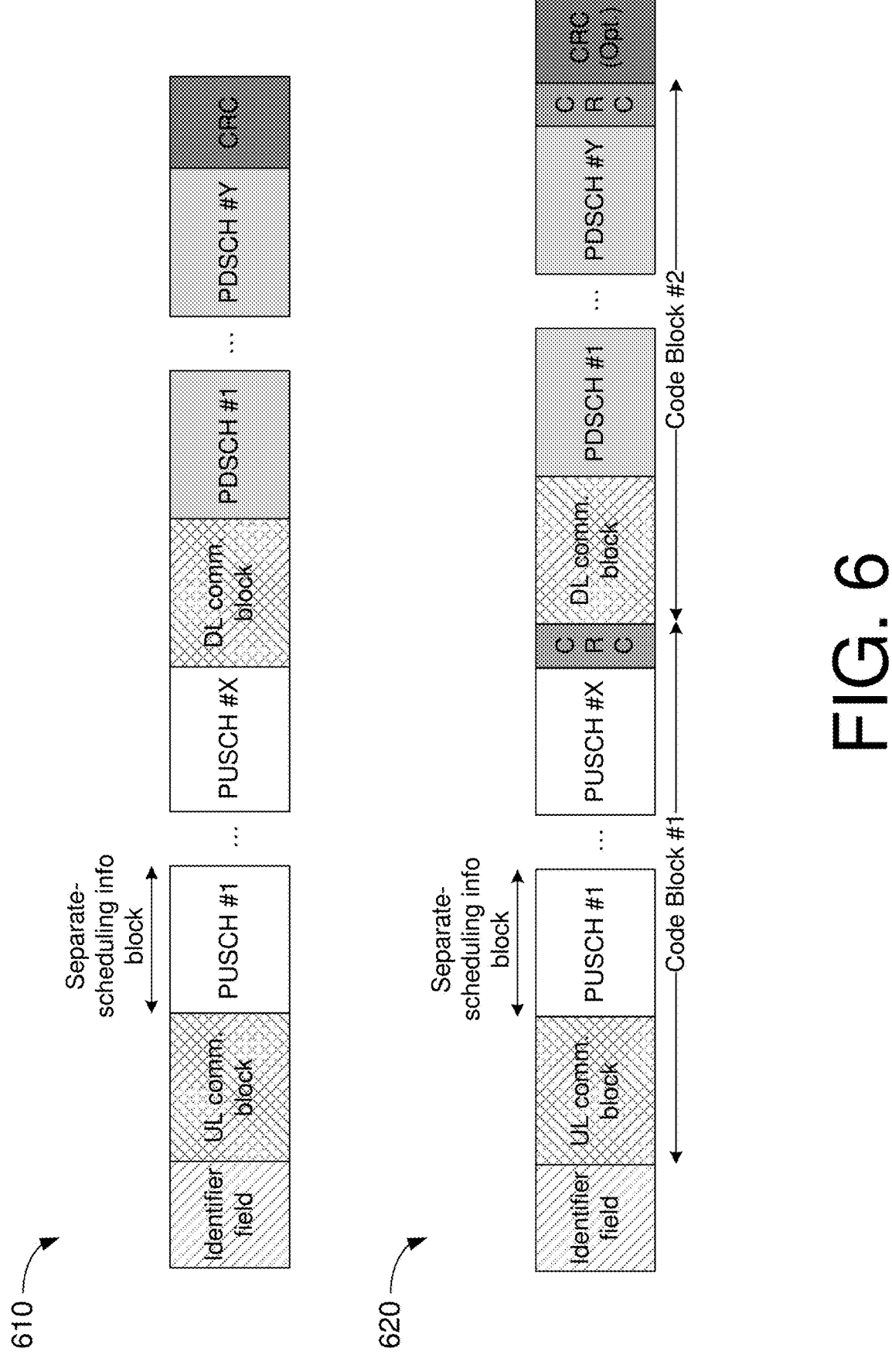
FIG. 6 is a diagram depicting example scenarios of DCI format for a second-stage DCI in accordance with implementations of the present disclosure.

FIG. 6 illustrates example scenarios 610 and 620 of DCI format for a second-stage DCI in accordance with implementations of the present disclosure. As shown in FIG. 6, the identifier field of the first-stage DCI is moved to the second-stage DCI, such that the first-stage DCI may be more compact in size. Specifically, scenario 610 depicts a DCI format for a second-stage DCI, which includes an identifier field, UL and/or DL common block(s), and one or multiple cascaded UL and/or DL separate-scheduling information blocks. Scenario 620 depicts a DCI format for a second-stage DCI, which includes an identifier field, a first CB to contain the UL common block and all separate-scheduling information blocks for UL, and a second CB to contain the DL common block and all separate-scheduling information blocks for DL. Each CB and the complete second-stage DCI may contain a respective CRC field, wherein the CRC field of the complete second-stage DCI in scenario 620 may be optional since the integrity of each CB can be verified with the corresponding CRC field thereof.

In some implementations, the unified two-stage DCI framework may also apply in multi-transmission/reception points (TRPs) scenarios. If two-stage DCI (i.e., including a first-stage DCI and a second-stage DCI) from multiple TRPs carry the same information, it may be determined that one search space is configured to monitor the first-stage DCI from multiple TRPs when the received signal is within the cyclic-prefix on the same time/frequency resource. Alternatively, when more than one search spaces are configured for monitoring the first-stage DCI from multiple TRPs, the second-stage DCI from multiple TRPs may be transmitted in a space-division multiplexing (SDM), frequency-division multiplexing (FDM), or time-division multiplexing (TDM) manner. For instance, higher-layer signaling (e.g., UE-specific RRC signaling) may be used to configure the SDM, FDM, or TDM transmission scheme, or an additional field in the first-stage DCI may be used to dynamically indicate the SDM, FDM or TDM transmission scheme. Otherwise, if two-stage DCI (i.e., including a first-stage DCI and a second-stage DCI) from multiple TRPs carry different information, it may be determined that multiple search spaces are configured to monitor the first-stage DCI from multiple TRPs. When multiple search spaces are configured to support two-stage DCI from multiple TRPs, the number of BDs is scaled up by a ratio of value=R, and the UE capability to report its BD capability in this case, which is denoted as r (r is an integer number), where R≤r.

Figure 7:
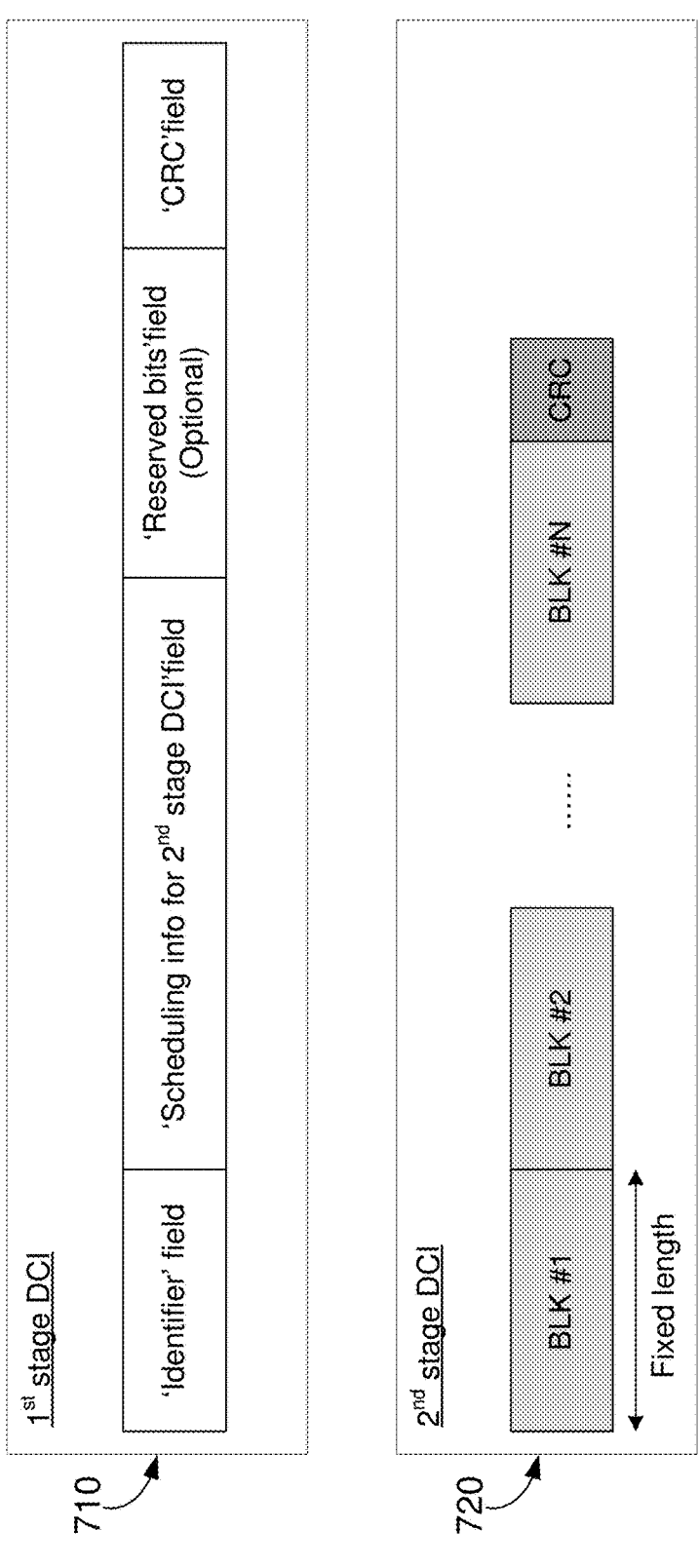
FIG. 7 is a diagram depicting an example scenario of a unified two-stage DCI framework for non-scheduling control in accordance with an implementation of the present disclosure.

FIG. 7 illustrates an example scenario 700 of a unified two-stage DCI framework for non-scheduling control in accordance with an implementation of the present disclosure. As shown in FIG. 7, a unified two-stage DCI framework proposes DCI formats 710 and 7250 for the first-stage DCI and the second-stage DCI, respectively, for non-scheduling control, and the framework supports UE groups where UEs in different UE groups may support different features. The DCI format 710 for the first-stage DCI includes at least a 'identifier' field, a 'scheduling information for the second-stage DCI' field, a 'reserved bits' field, and a 'CRC' field (e.g., in a size of 24 bits). Specifically, the 'identifier' field contains a bit map to indicate the purposes of the non-scheduling information in the second-stage DCI (e.g., 1 bit per purpose/use), and the order of the purposes in the bit map may be configured by UE-specific RRC signaling. The rest of the fields of the first-stage DCI may be similar to the example scenario 300. The size of the first-stage DCI may be aligned to the DCI size of broadcast PDCCH or uni-cast/multi-cast first-stage DCI. The DCI format 720 for the second-stage DCI includes one or more information blocks, each of which contains the feature information (for one or more UE groups) corresponding to one of the purposes signaled in the first-stage DCI. Specifically, the information block #X is present in the second-stage DCI if its corresponding sub-field in the identifier field of the first-stage DCI indicates 'present', and the bit length of each information block is the same and configured by higher-layer signaling (e.g., UE-specific RRC signaling). The CRC field of the second-stage DCI may be in a size less than 24 bits.

Figure 8:
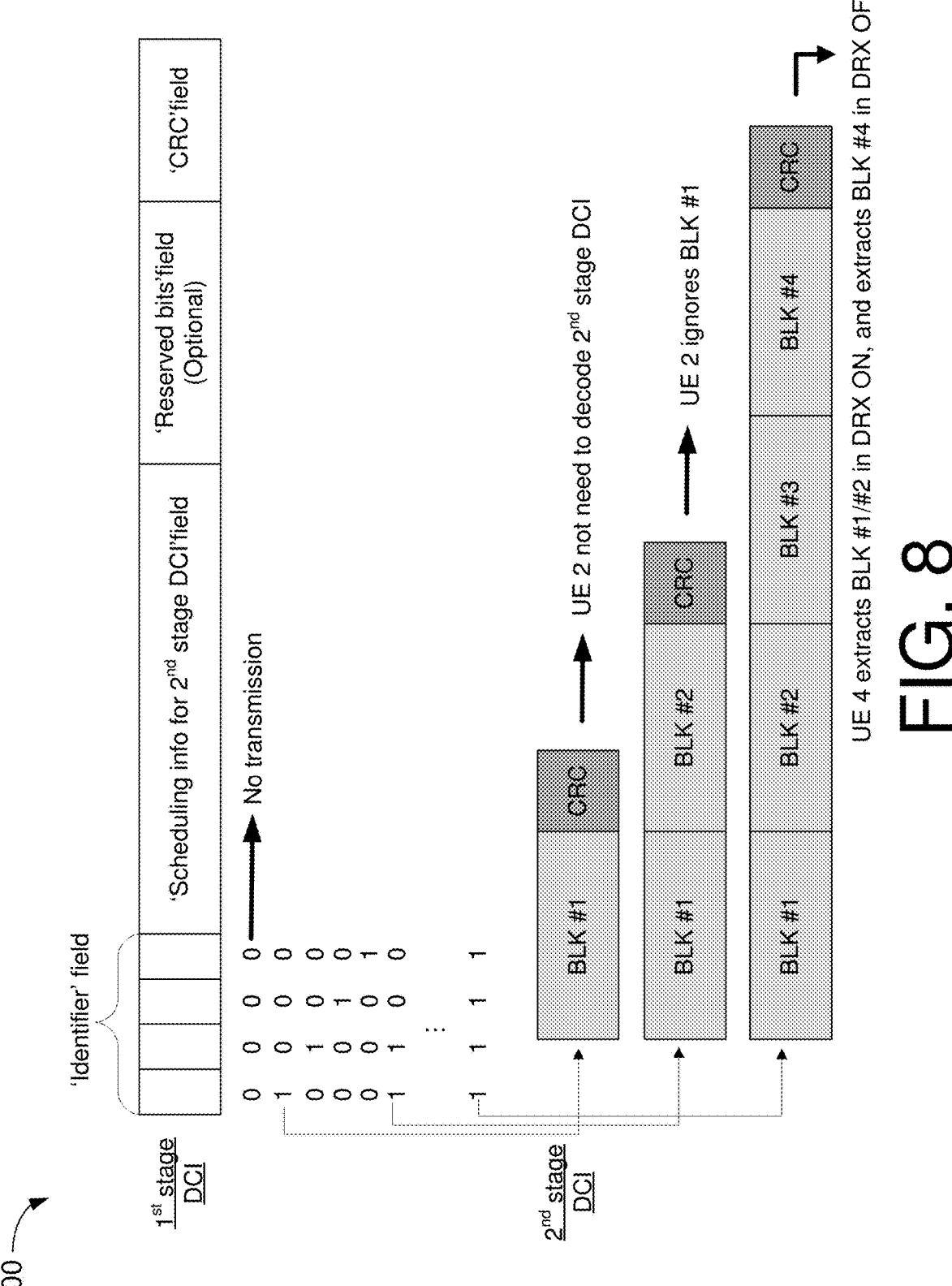
FIG. 8 is a diagram depicting an example scenario of a unified two-stage DCI framework for non-scheduling control in accordance with an implementation of the present disclosure.

FIG. 8 illustrates an example scenario 800 of a unified two-stage DCI framework for non-scheduling control in accordance with an implementation of the present disclosure. As shown in FIG. 8, the identifier field of the first-stage DCI includes 4 bits, and each bit indicates a respective purpose of an information block signaled in the second-stage DCI. Specifically, the first bit indicates that the corresponding information block in the second-stage DCI is used as a slot format indicator (i.e., used for slot format configuration), the second bit indicates that the corresponding information block in the second-stage DCI is used for PUCCH/PUSCH power control, the third bit indicates that the corresponding information block in the second-stage DCI is used as a preemption indication (i.e., an indication that some of the time/frequency resources (e.g., configured for enhanced mobile broadband (eMBB)) are used/preempted for ultra-reliable and low latency communications (URLLC)), and the fourth bit indicates that the corresponding information block in the second-stage DCI is used as a wake-up indication (e.g., in DRX OFF duration). Moreover, multiple groups of UEs with different features are supported. For instance, UE #1 supports the features associated with the slot format indicator and the PUCCH/PUSCH power control, UE #2 supports the features associated with the PUCCH/PUSCH power control and the preemption indication, and UE #3 supports the features associated with the slot format indicator, the PUCCH/PUSCH power control, and the wake-up indication. Accordingly, when UE #2 receives the first-stage DCI with the identifier field='1000', it may not need to decode the second-stage DCI since it does not support the feature associated with the slot format indicator. Alternatively, when UE #2 receives the first-stage DCI with the identifier field='1100', it may extract the information in block #2 and ignore the information in block #1. Furthermore, when UE #3 receives the first-stage DCI with the identifier field='1111', it may extract the information in blocks #1 and #2 (e.g., while monitoring the first-stage DCI and second-stage DCI during DRX ON duration), ignore the information in block #3, and extract the information in block #4 (e.g., while monitoring the first-stage DCI and second-stage DCI during DRX OFF duration).

In some implementations, higher-layer signaling (e.g., UE-specific RRC signaling) may be used to indicate the purpose index for each purpose. That is, the UE may only know the purpose index about its supported feature.

Illustrative Implementations

Figure 9:
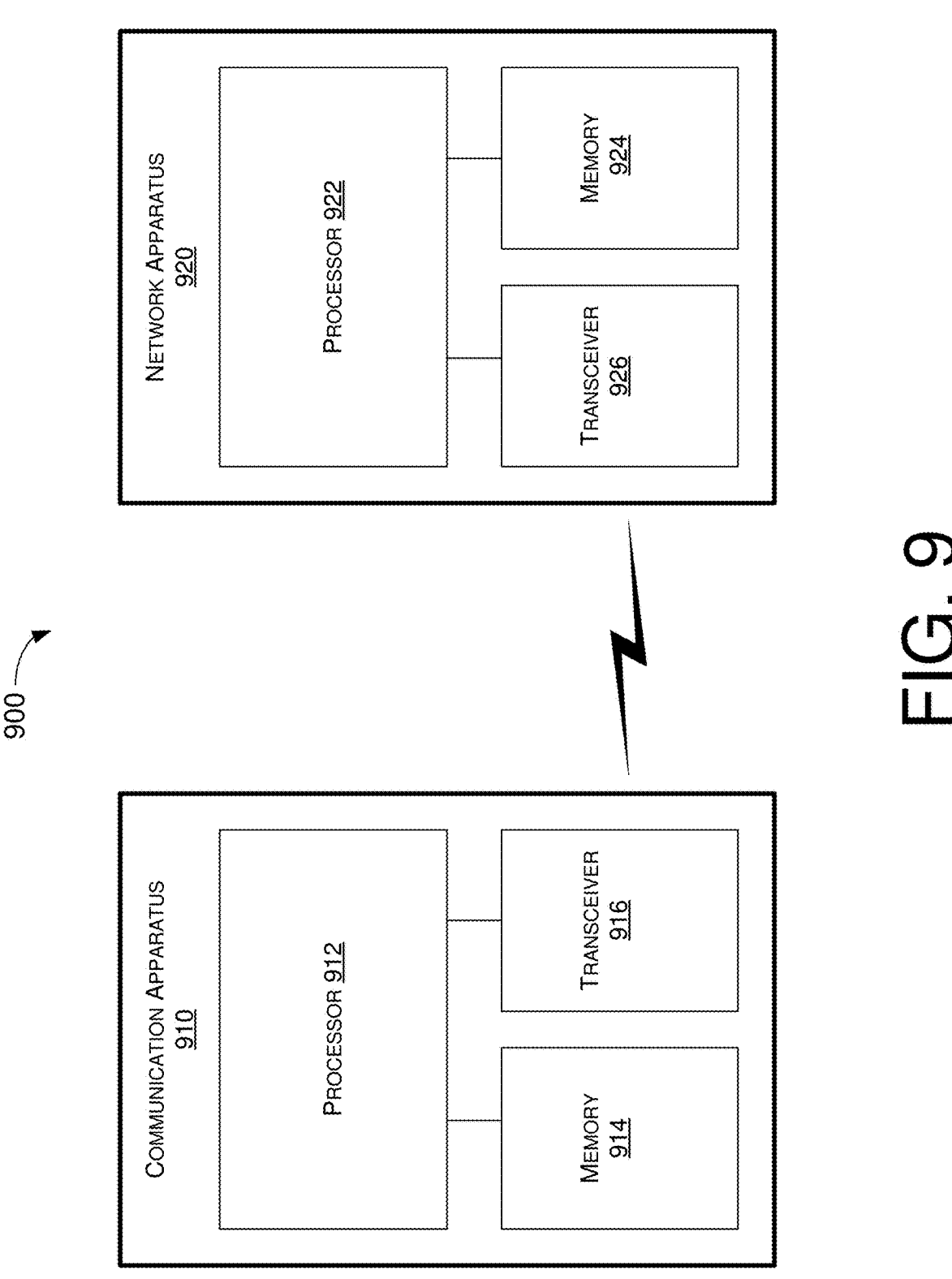
FIG. 9 is a block diagram of an example communication system in accordance with an implementation of the present disclosure.

FIG. 9 illustrates an example communication system 900 having an example communication apparatus 910 and an example network apparatus 920 in accordance with an implementation of the present disclosure. Each of communication apparatus 910 and network apparatus 920 may perform various functions to implement schemes, techniques, processes and methods described herein pertaining to providing a unified control channel framework in mobile communications, including scenarios/schemes described above as well as process 1000 described below.

Communication apparatus 910 may be a part of an electronic apparatus, which may be a UE such as a portable or mobile apparatus, a wearable apparatus, a wireless communication apparatus or a computing apparatus. For instance, communication apparatus 910 may be implemented in a smartphone, a smartwatch, a personal digital assistant, a digital camera, or a computing equipment such as a tablet computer, a laptop computer or a notebook computer. Communication apparatus 910 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 910 may be implemented in a smart thermostat, a smart fridge, a smart door lock, a wireless speaker or a home control center. Alternatively, communication apparatus 910 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 910 may include at least some of those components shown in FIG. 9 such as a processor 912, for example. Communication apparatus 910 may further include one or more other components not pertinent to the proposed scheme of the present disclosure (e.g., internal power supply, display device and/or user interface device), and, thus, such component(s) of communication apparatus 910 are neither shown in FIG. 9 nor described below in the interest of simplicity and brevity.

Network apparatus 920 may be a part of an electronic apparatus, which may be a network node such as a base station, a small cell, a router or a gateway. For instance, network apparatus 920 may be implemented in an eNodeB in an LTE, LTE-Advanced or LTE-Advanced Pro network or in a gNB or TRP in a 5G, NR, IoT, NB-IoT or IIoT network. Alternatively, network apparatus 920 may be implemented in the form of one or more IC chips such as, for example and without limitation, one or more single-core processors, one or more multi-core processors, or one or more RISC or CISC processors. Network apparatus 920 may include at least some of those components shown in FIG. 9 such as a processor 922, for example. Network apparatus 920 may further include one or more other components not pertinent to the proposed scheme of the present disclosure (e.g., internal power supply, display device and/or user interface device), and, thus, such component(s) of network apparatus 920 are neither shown in FIG. 9 nor described below in the interest of simplicity and brevity.

In one aspect, each of processor 912 and processor 922 may be implemented in the form of one or more single-core processors, one or more multi-core processors, or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including providing a unified control channel framework in mobile communications in accordance with various implementations of the present disclosure.

In some implementations, communication apparatus 910 may also include a transceiver 916 coupled to processor 912 and capable of wirelessly transmitting and receiving data. In some implementations, communication apparatus 910 may further include a memory 914 coupled to processor 912 and capable of being accessed by processor 912 and storing data therein. In some implementations, network apparatus 920 may also include a transceiver 926 coupled to processor 922 and capable of wirelessly transmitting and receiving data. In some implementations, network apparatus 920 may further include a memory 924 coupled to processor 922 and capable of being accessed by processor 922 and storing data therein. Accordingly, communication apparatus 910 and network apparatus 920 may wirelessly communicate with each other via transceiver 916 and transceiver 926, respectively. To aid better understanding, the following description of the operations, functionalities and capabilities of each of communication apparatus 910 and network apparatus 920 is provided in the context of a mobile communication environment in which communication apparatus 910 is implemented in or as a communication apparatus or a UE and network apparatus 920 is implemented in or as a network node of a communication network.

According to some schemes of the present disclosure, processor 912 of communication apparatus 910 may receive, via transceiver 916, a first-stage DCI from network apparatus 920. Specifically, the first-stage DCI indicates first scheduling information associated with a second-stage DCI. Then, processor 912 may receive, via transceiver 916, the second-stage DCI from network apparatus 920 according to the first scheduling information. Specifically, the second-stage DCI indicates second scheduling information associated with one or more carriers or cells or indicates non-scheduling information associated with one or more features. Also, processor 912 may perform operations including either one of the following: (1) performing a PDSCH reception or a PUSCH transmission on at least one of the one or more carriers or cells according to the second scheduling information; and (2) applying the non-scheduling information in an event that the apparatus supports at least one of the one or more features.

In some implementations, processor 912 may receive, via transceiver 916, a configuration of a search space for monitoring a PDCCH from network apparatus 920. Specifically, the receiving of the first-stage DCI includes performing one or more BDs on the PDCCH according to the configuration.

In some implementations, the second-stage DCI may be received on a DCI-only channel without performing any BD.

In some implementations, the second-stage DCI may be received in a control region of a scheduling cell, or in a data region of a scheduled cell.

In some implementations, the first-stage DCI may include at least one of the following: (1) a first field indicating identifier information; (2) a second field associated with the first scheduling information; (3) a third field indicating one or more reserved bits; and (4) a fourth field indicating CRC information.

In some implementations, the identifier information may indicate at least one of the following: (1) a format of the second-stage DCI is a fallback, non-fallback, or compact DCI; (2) either one or both of a downlink (DL) PDSCH and an uplink (UL) PUSCH is or are scheduled in the second-stage DCI; and (3) whether a DL PDSCH or an UL PUSCH for each BWP, carrier, or cell is scheduled in the second-stage DCI.

In some implementations, the second field may indicate which one of multiple first configurations of time and frequency resources is used for receiving the second-stage DCI, and the first configurations may be received via higher-layer signaling. Alternatively, the second field may include a second configuration of time and frequency resources for receiving the second-stage DCI.

In some implementations, the identifier information may indicate one or more purposes corresponding to the one or more features, the non-scheduling information may include one or more information blocks corresponding to the one or more features, and the non-scheduling information may be applied according to the identifier information.

In some implementations, the second-stage DCI may include one or more scheduling information blocks, each indicates a scheduling of a PDSCH reception or a PUSCH transmission on a respective one of the one or more carriers or cells.

In some implementations, the second-stage DCI may further include a DL or UL common block indicating common scheduling information for all of the one or more carriers or cells.

Illustrative Processes

FIG. 10 illustrates an example process 1000 in accordance with an implementation of the present disclosure. Process 1000 may be an example implementation of above scenarios/schemes, whether partially or completely, with respect to providing a unified control channel framework in mobile communications. Process 1000 may represent an aspect of implementation of features of communication apparatus 910. Process 1000 may include one or more operations, actions, or functions as illustrated by one or more of blocks 1010 to 1030. Although illustrated as discrete blocks, various blocks of process 1000 may be divided into additional blocks, combined into fewer blocks, or eliminated, depending on the desired implementation. Moreover, the blocks of process 1000 may be executed in the order shown in FIG. 10 or, alternatively, in a different order. Process 1000 may be implemented by communication apparatus 910 or any suitable UE or machine type devices. Solely for illustrative purposes and without limitation, process 1000 is described below in the context of communication apparatus 910. Process 1000 may begin at block 1010.

At 1010, process 1000 may involve processor 912 of communication apparatus 910 receiving, via transceiver 916, a first-stage DCI from a network node (e.g., network apparatus 920) of a wireless network, wherein the first-stage DCI indicates first scheduling information associated with a second-stage DCI. Process 1000 may proceed from 1010 to 1020.

At 1020, process 1000 may involve processor 912 receiving, via transceiver 916, the second-stage DCI from the network node according to the first scheduling information, wherein the second-stage DCI indicates second scheduling information associated with one or more carriers or cells or indicates non-scheduling information associated with one or more features. Process 1000 may proceed from 1020 to 1030.

At 1030, process 1000 may involve processor 912 performing operations including either one of the following: (1) performing a PDSCH reception or a PUSCH transmission on at least one of the one or more carriers or cells according to the second scheduling information; and (2) applying the non-scheduling information in an event that the apparatus supports at least one of the one or more features.

In some implementations, process 1000 may further involve processor 912 receiving, via transceiver 916, a configuration of a search space for monitoring a PDCCH from the network node.

In some implementations, the second-stage DCI may be received on a DCI-only channel without performing any BD.

In some implementations, the second-stage DCI may be received in a control region of a scheduling cell, or in a data region of a scheduled cell.

In some implementations, the first-stage DCI may include at least one of the following: (1) a first field indicating identifier information; (2) a second field associated with the first scheduling information; (3) a third field indicating one or more reserved bits; and (4) a fourth field indicating CRC information.

In some implementations, the identifier information may indicate at least one of the following: (1) a format of the second-stage DCI is a fallback, non-fallback, or compact DCI; (2) either one or both of a downlink (DL) PDSCH and an uplink (UL) PUSCH is or are scheduled in the second-stage DCI; and (3) whether a DL PDSCH or an UL PUSCH for each BWP, carrier, or cell is scheduled in the second-stage DCI.

In some implementations, the second field may indicate which one of multiple first configurations of time and frequency resources is used for receiving the second-stage DCI, and the first configurations may be received via higher-layer signaling. Alternatively, the second field may include a second configuration of time and frequency resources for receiving the second-stage DCI.

In some implementations, the identifier information may indicate one or more purposes corresponding to the one or more features, the non-scheduling information may include one or more information blocks corresponding to the one or more features, and the non-scheduling information may be applied according to the identifier information.

In some implementations, the second-stage DCI may include one or more scheduling information blocks, each indicates a scheduling of a PDSCH reception or a PUSCH transmission on a respective one of the one or more carriers or cells.

In some implementations, the second-stage DCI may further include a DL or UL common block indicating common scheduling information for all of the one or more carriers or cells.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically inter-actable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, a first-stage downlink control information (DCI) on a first physical downlink control channel (PDCCH) from a network node of a wireless network, wherein the first-stage DCI indicates first scheduling information associated with a second-stage DCI on a second PDCCH;
receiving, by the processor, the second-stage DCI on the second PDCCH from the network node according to the first scheduling information, wherein the second-stage DCI indicates second scheduling information associated with one or more carriers or cells or indicates non-scheduling information associated with one or more features; and
performing, by the processor, operations comprising either one of the following:
performing a physical downlink shared channel (PDSCH) reception or a physical uplink shared channel (PUSCH) transmission on at least one of the one or more carriers or cells according to the second scheduling information; and
applying the non-scheduling information in an event that the apparatus supports at least one of the one or more features.

2. The method of claim 1, further comprising:
receiving, by the processor, a configuration of a search space for monitoring the first PDCCH from the network node;
wherein the receiving of the first-stage DCI comprises performing one or more blind decodings (BDs) on the first PDCCH according to the configuration.

3. The method of claim 1, wherein the second PDCCH is a DCI-only channel, and the second-stage DCI is received without performing any blind decoding (BD).

4. The method of claim 1, wherein the second-stage DCI is received in a control region of a scheduling cell, or in a data region of a scheduled cell.

5. The method of claim 1, wherein the first-stage DCI comprises at least one of the following:
a first field indicating identifier information;
a second field associated with the first scheduling information;
a third field indicating one or more reserved bits; and
a fourth field indicating cyclic redundancy check (CRC) information.

6. The method of claim 5, wherein the identifier information indicates at least one of the following:
a format of the second-stage DCI is a fallback, non-fallback, or compact DCI;
either one or both of a downlink (DL) PDSCH and an uplink (UL) PUSCH is or are scheduled in the second-stage DCI; and
whether a DL PDSCH or an UL PUSCH for each bandwidth part (BWP), carrier, or cell is scheduled in the second-stage DCI.

7. The method of claim 5, wherein:
the second field indicates which one of multiple first configurations of time and frequency resources is used for receiving the second-stage DCI, and the first configurations are received via higher-layer signaling; or
the second field comprises a second configuration of time and frequency resources for receiving the second-stage DCI.

8. The method of claim 5, wherein the identifier information indicates one or more purposes corresponding to the one or more features, the non-scheduling information comprises one or more information blocks corresponding to the one or more features, and the non-scheduling information is applied according to the identifier information.

9. The method of claim 1, wherein the second-stage DCI comprises one or more scheduling information blocks, each indicates a scheduling of a PDSCH reception or a PUSCH transmission on a respective one of the one or more carriers or cells.

10. The method of claim 9, wherein the second-stage DCI further comprises a DL or UL common block indicating common scheduling information for all of the one or more carriers or cells.

11. An apparatus, comprising:

a transceiver which, during operation, wirelessly communicates with a network node of a wireless network; and a processor communicatively coupled to the transceiver such that, during operation, the processor performs operations comprising:

receiving, via the transceiver, a first-stage downlink control information (DCI) on a first physical downlink control channel (PDCCH) from the network node, wherein the first-stage DCI indicates first scheduling information associated with a second-stage DCI on a second PDCCH;

receiving, via the transceiver, the second-stage DCI on the second PDCCH from the network node according to the first scheduling information, wherein the second-stage DCI indicates second scheduling information associated with one or more carriers or cells or indicates non-scheduling information associated with one or more features; and performing operations comprising either one of the following:

performing a physical downlink shared channel (PDSCH) reception or a physical uplink shared channel (PUSCH) transmission on at least one of the one or more carriers or cells according to the second scheduling information; and applying the non-scheduling information in an event that the apparatus supports at least one of the one or more features.

12. The apparatus of claim 11, wherein, during operation, the processor further performs operations comprising:

receiving, via the transceiver, a configuration of a search space for monitoring the first PDCCH from the network node;

wherein the receiving of the first-stage DCI comprises performing one or more blind decodings (BDs) on the first PDCCH according to the configuration.

13. The apparatus of claim 11, wherein the second PDCCH is a DCI-only channel, and the second-stage DCI is received without performing any blind decoding (BD).

14. The apparatus of claim 11, wherein the second-stage DCI is received in a control region of a scheduling cell, or in a data region of a scheduled cell.

15. The apparatus of claim 11, wherein the first-stage DCI comprises at least one of the following:

a first field indicating identifier information;

a second field associated with the first scheduling information;

a third field indicating one or more reserved bits; and a fourth field indicating cyclic redundancy check (CRC) information.

16. The apparatus of claim 15, wherein the identifier information indicates at least one of the following:

a format of the second-stage DCI is a fallback, non-fallback, or compact DCI;

either one or both of a downlink (DL) PDSCH and an uplink (UL) PUSCH is or are scheduled in the second-stage DCI; and whether a DL PDSCH or an UL PUSCH for each bandwidth part (BWP), carrier, or cell is scheduled in the second-stage DCI.

17. The apparatus of claim 15, wherein:

the second field indicates which one of multiple first configurations of time and frequency resources is used for receiving the second-stage DCI, and the first configurations are received via higher-layer signaling; or the second field comprises a second configuration of time and frequency resources for receiving the second-stage DCI.

18. The apparatus of claim 15, wherein the identifier information indicates one or more purposes corresponding to the one or more features, the non-scheduling information comprises one or more information blocks corresponding to the one or more features, and the non-scheduling information is applied according to the identifier information.

19. The apparatus of claim 11, wherein the second-stage DCI comprises one or more scheduling information blocks, each indicates a scheduling of a PDSCH reception or a PUSCH transmission on a respective one of the one or more carriers or cells.

20. The apparatus of claim 19, wherein the second-stage DCI further comprises a DL or UL common block indicating common scheduling information for all of the one or more carriers or cells.

* * * * *